United States Patent
Suleiman et al.

(10) Patent No.: US 12,249,838 B2
(45) Date of Patent: Mar. 11, 2025

(54) SYSTEM AND METHOD FOR USING BASELOAD POWER OF RESERVE GT SYSTEM FOR IMPROVING GT EMISSIONS OR GRID STABILITY

(71) Applicant: GE Infrastructure Technology LLC, Greenville, SC (US)

(72) Inventors: Baha Mahmoud Suleiman, Damman (SA); Hatem Selim, Damman (SA); Majed Sammak, Damman (SA); Alaaeldin Elsaeed Dawood, Damman (SA); Abdurrahman Abdallah Khalidi, Dubai (AE)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/576,665

(22) PCT Filed: Dec. 2, 2021

(86) PCT No.: PCT/US2021/072692
§ 371 (c)(1),
(2) Date: Jan. 4, 2024

(87) PCT Pub. No.: WO2022/265677
PCT Pub. Date: Dec. 22, 2022

(65) Prior Publication Data
US 2024/0222980 A1    Jul. 4, 2024

Related U.S. Application Data

(63) Continuation of application No. PCT/US2021/037742, filed on Jun. 17, 2021.

(51) Int. Cl.
H02J 3/48    (2006.01)
H02J 3/28    (2006.01)
H02J 3/38    (2006.01)

(52) U.S. Cl.
CPC ...... H02J 3/48 (2013.01); H02J 3/28 (2013.01); H02J 3/381 (2013.01); H02J 2300/20 (2020.01); H02J 2300/30 (2020.01)

(58) Field of Classification Search
CPC ........ H02J 3/28; H02J 3/38; H02J 3/48; H02J 15/00
See application file for complete search history.

(56) References Cited

U.S. PATENT DOCUMENTS

2018/0254498 A1* 9/2018 Patel .................. H01M 8/0681

* cited by examiner

Primary Examiner — Shafiq Mian
(74) Attorney, Agent, or Firm — Charlotte Wilson; James Pemrick; Hoffman Warnick LLC

(57) ABSTRACT

A system includes a gas turbine (GT) system at a power plant operatively coupled to a generator to always generate power at a baseload. A first portion of the GT system's baseload power is transmitted to an electric grid. Where demand for power from the grid does not exceed a threshold, a second portion of the GT system's baseload power is transmitted to a hydrogen-producing electrolyzer to generate hydrogen fuel for a second GT system. Where demand for power from the grid exceeds the threshold, a third portion of the GT system's baseload power is transmitted to the grid. The GT system always runs at baseload but is capable of providing increased power to the grid quickly, like conventional spinning reserves. The system improves efficiencies by running all GT systems at baseload, and reduces emissions for the second GT system by providing hydrogen fuel thereto when grid power demand allows.

20 Claims, 8 Drawing Sheets

SYSTEM AND METHOD FOR USING BASELOAD POWER OF RESERVE GT SYSTEM FOR IMPROVING GT EMISSIONS OR GRID STABILITY

TECHNICAL FIELD

The disclosure relates generally to power plant control systems and, more particularly, to a system that operates a reserve gas turbine (GT) system at baseload and uses a portion of the baseload power to: operate a hydrogen-producing electrolysis system to supply hydrogen fuel for injection to other GT systems when grid power demand allows, or supply power to the grid when grid power demand requires. As a result, the efficiency, performance and/or emissions of the GT system(s) and/or grid stability can be improved.

BACKGROUND

Power plants supply a wide-area electric grid with electric power. In some cases, power plants may include a number of gas turbine (GT) systems at a particular site. In order to run the power plant efficiently and attain the longest lifetime for the GT systems, it is best to run the gas turbines at or near full capacity, referred to as 'baseload.' It is noted that the baseload may exclude some minor reserve, referred to as 'primary control reserve,' to automatically address frequency changes on the grid at the GT system. A stable electric grid requires that the power generated by power plants supplying power to the grid match the demand for electric power at all times regardless of fluctuations in demand. Consequently, to maintain a stable electric grid, power plants are typically required to maintain a certain amount of additional capacity or standby load, referred to as 'spinning reserve,' so additional power can be provided when required. The primary control reserve of the GT systems is incapable of addressing power demand fluctuations from the wide-area electric grid.

In order to address demand fluctuations, one GT system is designated as a spinning reserve or simply reserve GT system and is not run at baseload. For example, the reserve GT system may run at 50-100% load depending on grid power demand. Hence, for a power plant with ten GT systems, the power plant may deliver, for example, 95% of capacity with 5% being spinning reserve when increased demand does not exist. In this manner, when power demand increases, the reserve capacity of the reserve GT system (e.g., up to 50%) can be leveraged to generate more power quickly to maintain the stability of the grid.

There are a number of challenges with operating reserve GT systems. For example, operating a GT system at a level below baseload is highly inefficient because the system, for example, burns fuel inefficiently, has increased emissions, and is generally harder to control relative to fluctuations in output. Operating a reserve GT system also represents an expense for power delivery companies that buy power from power plants because they are paying for the unused capacity of the power plant and the inefficient operation of the reserve GT system.

BRIEF DESCRIPTION

All aspects, examples, and features mentioned below can be combined in any technically possible way.

An aspect of the disclosure provides a system, comprising: a first GT system operatively coupled to a first generator to generate a baseload power, wherein a first portion of the baseload power generated by the first GT system is transmitted to a wide-area electric grid controlled by a transmission system operator (TSO): a second GT system operatively coupled to a second generator to generate power for transmission to the wide-area electric grid: a hydrogen-producing electrolyzer operatively coupled to deliver hydrogen fuel to one or both of the first GT system and the second GT system, the hydrogen-producing electrolyzer configured to be selectively powered by either a second portion of the baseload power generated by the first GT system or power returned from the wide-area electric grid: and a controller configured to: in response to a demand for power from the TSO not exceeding a threshold, instruct that the second portion of the baseload power generated by the first GT system be transmitted to the hydrogen-producing electrolyzer to generate hydrogen fuel for one or both of the first GT system and the second GT system: and in response to the demand for power from the TSO exceeding the threshold, instruct that a third portion of the baseload power generated by the first GT system be transmitted to the wide-area electric grid.

Another aspect of the disclosure includes any of the preceding aspects, and further comprising a plurality of third GT systems co-located with the first GT system, each third GT system operatively coupled to a third generator to generate a baseload power for transmission to the wide-area electric grid.

Another aspect of the disclosure includes any of the preceding aspects, and the second GT system is at least one of the plurality of third GT systems.

Another aspect of the disclosure includes any of the preceding aspects, and at least two of the first, second, and third generators are the same generator.

Another aspect of the disclosure includes any of the preceding aspects, and the hydrogen-producing electrolyzer and the second GT system are located at a different geographical location from the first GT system.

Another aspect of the disclosure includes any of the preceding aspects, and the third portion of the baseload power generated by the first GT system is maintained as a primary control reserve by a governor of the first GT system.

Another aspect of the disclosure includes any of the preceding aspects, and the second portion of the baseload power generated by the first GT system is transmitted directly to the hydrogen-producing electrolyzer to generate hydrogen fuel for the one or both of the first GT system and the second GT system without passing through the wide-area electric grid.

Another aspect of the disclosure includes any of the preceding aspects, and the controller is located at the TSO of the wide-area electric grid.

Another aspect of the disclosure includes any of the preceding aspects, in which the third portion of the baseload power generated by the first GT system is transmitted to the wide-area electric grid, and power from the wide-area electric grid is transmitted to the hydrogen-producing electrolyzer to generate hydrogen fuel for the second GT system.

Another aspect of the disclosure includes any of the preceding aspects, and in response to the controller instructing that the third portion of the baseload power generated by the first GT system be transmitted to the wide-area electric grid, the controller adjusts at least a non-hydrogen fuel flow rate of the second GT system to maintain an output of the second GT system.

An aspect of the disclosure provides a system, comprising: a first GT system operatively coupled to a first generator to generate a baseload power, wherein the baseload power is transmitted to a wide-area electric grid controlled by a transmission system operator (TSO): a second GT system operatively coupled to a second generator to generate power for transmission to the wide-area electric grid: a hydrogen-producing electrolyzer configured to be selectively powered by power from the wide-area electric grid, the hydrogen-producing electrolyzer operatively coupled to deliver hydrogen fuel to the second GT system: and a controller configured to: in response to excess power from the wide-area electric grid exceeding a threshold, increasing power to the hydrogen-producing electrolyzer from the wide-area electric grid to increase hydrogen fuel generated for the second GT system: and in response to the excess power from the wide-area electric grid not exceeding a threshold, decreasing power to the hydrogen-producing electrolyzer from the wide-area electric grid to decrease hydrogen fuel generated for the second GT system.

Another aspect of the disclosure includes any of the preceding aspects, and further comprising a plurality of third GT systems co-located with the first GT system, each third GT system operatively coupled to a third generator to generate a baseload power for transmission to the wide-area electric grid.

Another aspect of the disclosure includes any of the preceding aspects, and the second GT system is at least one of the plurality of third GT systems.

Another aspect of the disclosure includes any of the preceding aspects, and the hydrogen-producing electrolyzer and the second GT system are located at a different geographical location from the first GT system.

Another aspect of the disclosure includes any of the preceding aspects, and in response to the controller instructing cessation of power transmission to the hydrogen-producing electrolyzer from the wide-area electric grid, the controller adjusts at least a non-hydrogen fuel flow rate of the second GT system to maintain an output of the second GT system.

Another aspect of the disclosure includes any of the preceding aspects, and the controller is located at the TSO of the wide-area electric grid.

An aspect of the disclosure provides a method, comprising: transmitting a first portion of a baseload power generated by a first GT system coupled to a first generator to a wide-area electric grid controlled by a transmission system operator (TSO): in response to a demand for power from the wide-area electric grid not exceeding a threshold, transmitting a second portion of the baseload power generated by the first GT system to a hydrogen-producing electrolyzer, the hydrogen-producing electrolyzer operatively coupled to deliver hydrogen fuel to a second GT system, the second GT system operatively coupled to a second generator to generate power: and, in response to the demand for power from the wide-area electric grid exceeding the threshold, transmitting a third portion of the baseload power generated by the first GT system to the wide-area electric grid.

Another aspect of the disclosure includes any of the preceding aspects, and further comprising transmitting a baseload power generated by a plurality of third GT systems and operatively coupled to a third generator to the wide-area electric grid, wherein the plurality of third GT systems are co-located with the first GT system, and wherein the second GT system is at least one of the plurality of third GT systems.

Another aspect of the disclosure includes any of the preceding aspects, and the hydrogen-producing electrolyzer and the second GT system are located at a different geographical location from the first GT system.

Another aspect of the disclosure includes any of the preceding aspects, and, in response to transmitting the third portion of the baseload power generated by the first GT system to the wide-area electric grid, adjusting at least a non-hydrogen fuel flow rate of the second GT system to maintain an output of the second GT system.

Two or more aspects described in this disclosure, including those described in this summary section, may be combined to form implementations not specifically described herein.

The details of one or more implementations are set forth in the accompanying drawings and the description below. Other features, objects, and advantages will be apparent from the description and drawings and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
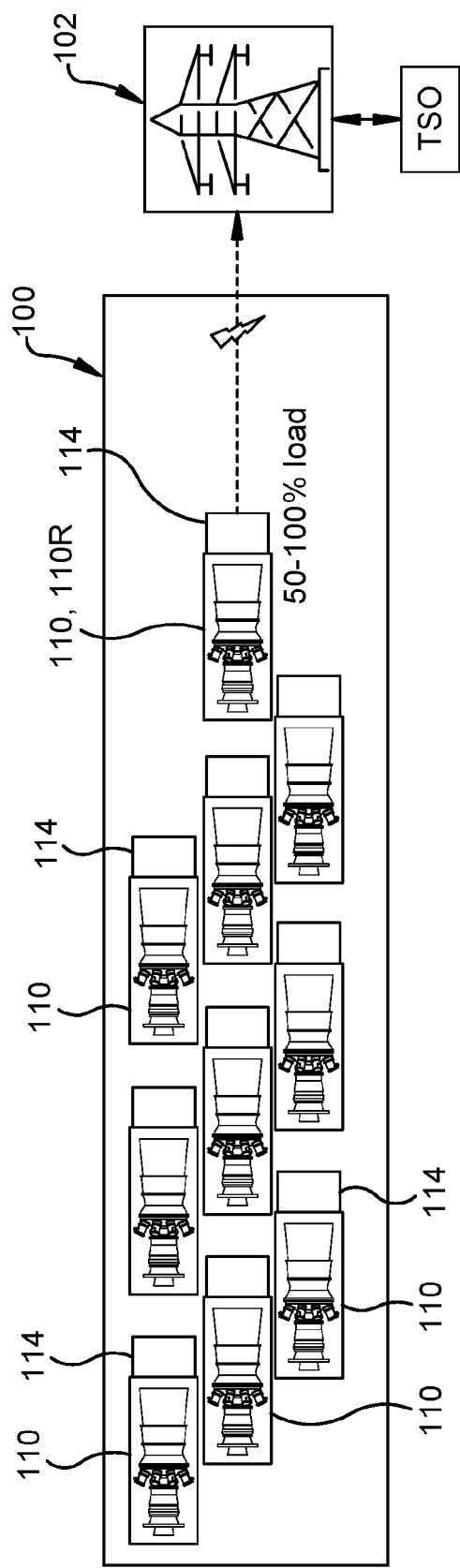
FIG. 1 shows a schematic view of an illustrative power plant system according to the prior art.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within turbomachines used to generate electric power.

To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates). The terms "forward" and "aft," without any further specificity, refer to directions, with "forward" referring to the front or compressor end of the engine, and "aft" referring to the rearward section of the turbomachine.

It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification and claims, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there are no intervening elements or layers present. Where electric power is "directed to" a structure, there may be no intervening structures present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As used herein, "baseload power" indicates a power output of a particular gas turbine (GT) system operating at full capacity. It is noted that baseload power may except any "primary control reserve," which is a portion of the gas turbine's output automatically controlled by any GT system's respective governor to provide reserve power in opposition to any frequency change relative to the grid, i.e., instability due to imbalance between demand and generation. Primary control reserve provides very quick response to changes, e.g., fifteen seconds. "Spinning reserve" indicates a portion of a power plant capacity set aside for when additional power is demanded, i.e., from a transmission system operator (TSO) of a wide-area electric grid. "Secondary control reserve" is that portion of spinning reserve that is set aside for automatic generation control (AGC) (also known as load frequency control (LFC)) by a TSO.

In this setting, a TSO is an entity entrusted with controlling transmission of electrical power to and from a wide-area electric grid. The geographic area covered by a TSO can vary, e.g., on a national or regional level, such as a US state-based independent system operator. TSOs control power plants and transmission of power on the wide-area electric to maintain stability of the wide-area electric grid. AGC is a system for frequently, quickly, and automatically adjusting the power output of multiple generators at different power plants responsive to changing loads to ensure load and generation continually match, e.g., based on system frequency. An AGC system can act, for example, within around ten minutes.

Where system frequency increases, more power is being produced than used, resulting in the generators at the power plants accelerating. Here, the AGC may reduce power output of one or more power plants. If system frequency decreases, more load is present than the current generation can supply, and the generators at the power plants decelerate. Here, the AGC may increase power output of one or more power plants. "Tertiary control reserve" is that portion of spinning reserve that is set aside for manual adjustment by a TSO, e.g., where secondary control reserve is insufficient to maintain stability. The response time here may be around, for example, thirty minutes.

Referring to FIG. 1, power plants 100 supply a wide-area electric grid 102 (hereinafter simply "grid 102") with electric power. In some cases, power plants 100 may include a number of GT systems 110 at a particular site. Each GT system 110 may be coupled to a generator 114, or they may share generators. In order to run power plants 100 efficiently and attain the longest lifetime for GT systems 110, it is best to run GT systems 110 at baseload power. A stable electric grid requires that the power generated by power plants 100 supplying power to grid 102 match the demand for electric power at all times regardless of fluctuations in demand. Consequently, to maintain a stable electric grid, power plants 100 are typically required to maintain spinning reserve, so additional power can be provided when required.

In FIG. 1, a spinning reserve GT system 110R is illustrated. Reserve GT system 110R may run at 50-100% load depending on power demand. Hence, for an illustrative power plant 100 with ten (10) GT systems 110, the power plant would normally deliver 95% of capacity with 5% being spinning reserve when increased demand is not present. In this manner, when power demand increases, the additional capacity of reserve GT system 110R in power plant 100, i.e., up to 50%, can be used to generate power quickly to maintain the stability of grid 102. The amount of the spinning reserve employed can fluctuate based on many factors such as average increase/decrease in demand over time, geographic location, grid infrastructure, etc. Disadvantageously, operating reserve GT system 110R at a level below baseload or with a high level of output fluctuation is highly inefficient because the system, for example, burns fuel inefficiently, has increased emissions, and is generally harder to control relative to fluctuations in output. Additionally, operating a reserve GT system 110R represents an expense for power delivery companies that buy energy from power plants 100 because they are paying for unused capacity of power plant 100 and the inefficient operation of reserve GT system 110R.

Embodiments of the disclosure include a system including one or more power plants having a first, reserve GT system in communication with a controller and operatively coupled to a first generator to generate baseload power. The power plant may include any number of other primary GT systems operatively coupled to a generator(s) to generate baseload power for a grid controlled by a TSO. A hydrogen-producing electrolyzer(s) can be selectively powered by the reserve GT system. A first portion of the reserve GT system's baseload power is transmitted to the grid. Where demand for power from the TSO does not exceed a threshold, the controller instructs a second portion of the reserve GT system's baseload power to be transmitted to the hydrogen-producing electrolyzer(s) to generate hydrogen fuel for a second, supplemented GT system(s), improving the latter's emissions. Where demand for power from the TSO exceeds the threshold (e.g., demand increases), the controller instructs the second portion of the reserve GT system's baseload power be transmitted to the grid.

By always generating baseload power, this approach reduces fuel consumption, improves the consistency of firing temperature, increases the component longevity (lowering maintenance), and reduces the emissions of the reserve GT system, thus improving the overall performance of the power plant in which it is used. When grid power demand increases, the system turns off the hydrogen-producing electrolyzer and transmits the power from the reserve GT system to the grid to maintain grid stability. Thus, the system also fulfills the role of conventional spinning reserve without the disadvantages thereof.

Referring to FIGS. 2 and 6-9, embodiments of a system 200 according to embodiments of the disclosure will be described. System 200 includes one or more power plants 202, represented by stacked rectangles. Each power plant 202 includes a (first) GT system 210R operatively coupled to a first generator 212 to generate a baseload power. For purposes of description, GT system 210R will be referred to as a "reserve GT system 210R" because it is the GT system among a plurality of other GT systems 220 that provides reserve power to grid 204, when required. However, reserve GT system 210R operates at baseload power (full capacity), as defined herein, and does not provide spinning reserve power, as defined herein.

Each power plant 202 may also include one or more additional GT systems 220. For purposes of description, GT systems 220 will be referred to as a "primary GT systems 220" because their function is to provide the primary, baseload (full capacity) power to grid 204 with little to no excess capacity other than primary control reserves, as defined herein. As noted, primary control reserve represents a third portion of the baseload power generated by, for example, reserve GT system 210R and maintained by a governor 223 of reserve GT system 210R (governors for primary GT systems 220) not shown for clarity).

Figure 2:
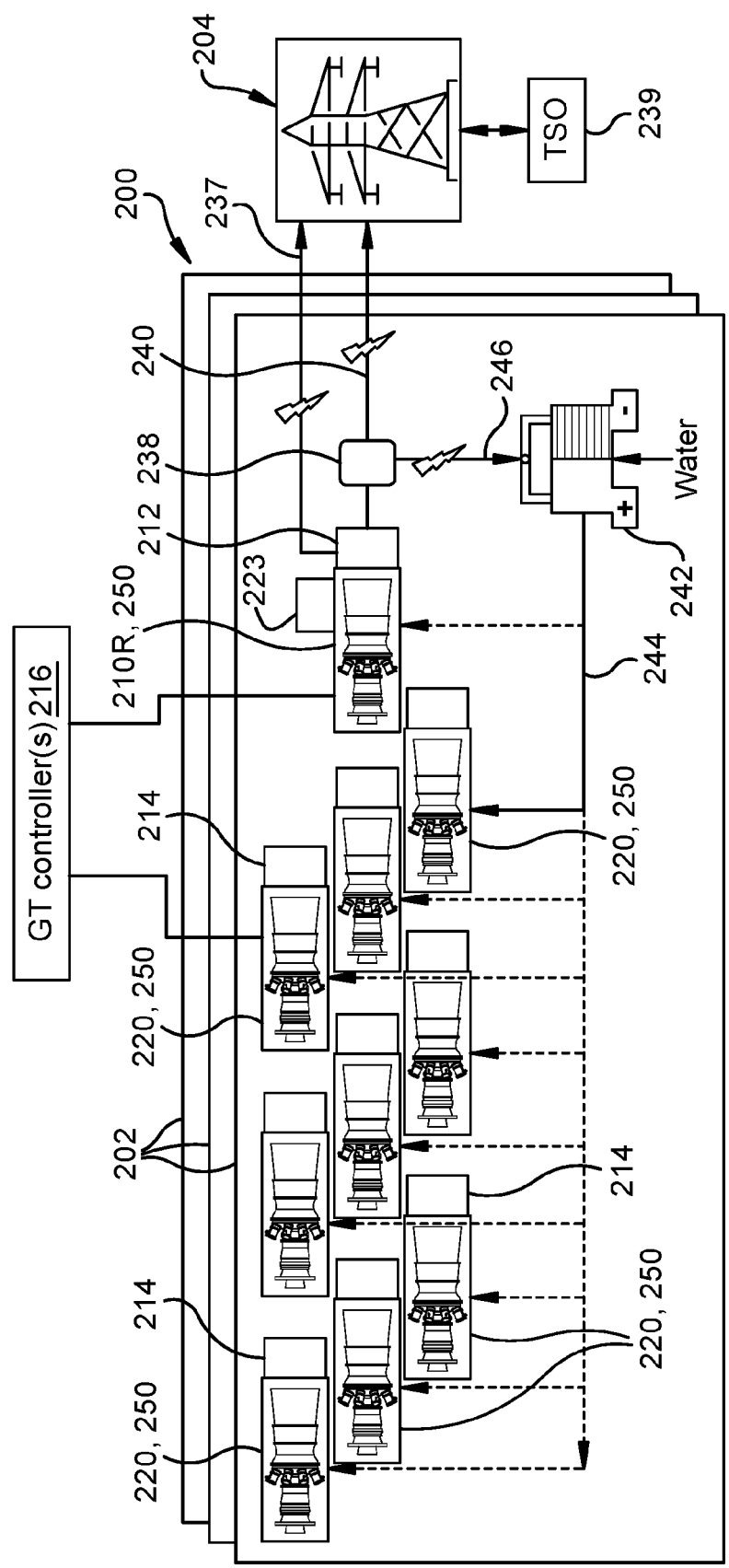
FIG. 2 shows a schematic view of a system, according to embodiments of the disclosure.

In certain embodiments, system 200 may include a plurality of primary GT systems 220 co-located with reserve GT system 210R. In FIG. 2, for example, nine primary GT systems 220 are illustrated, but any number may be provided. Each primary GT system 220 may be operatively coupled to a generator 214 to generate a baseload power for transmission to grid 204. While each primary GT system 220 is shown with a corresponding generator 214, it will be recognized that certain primary GT systems 220 may share a generator. For clarity, the electrical transmission between primary GT systems 220 and grid 204 is not illustrated.

Figure 7:
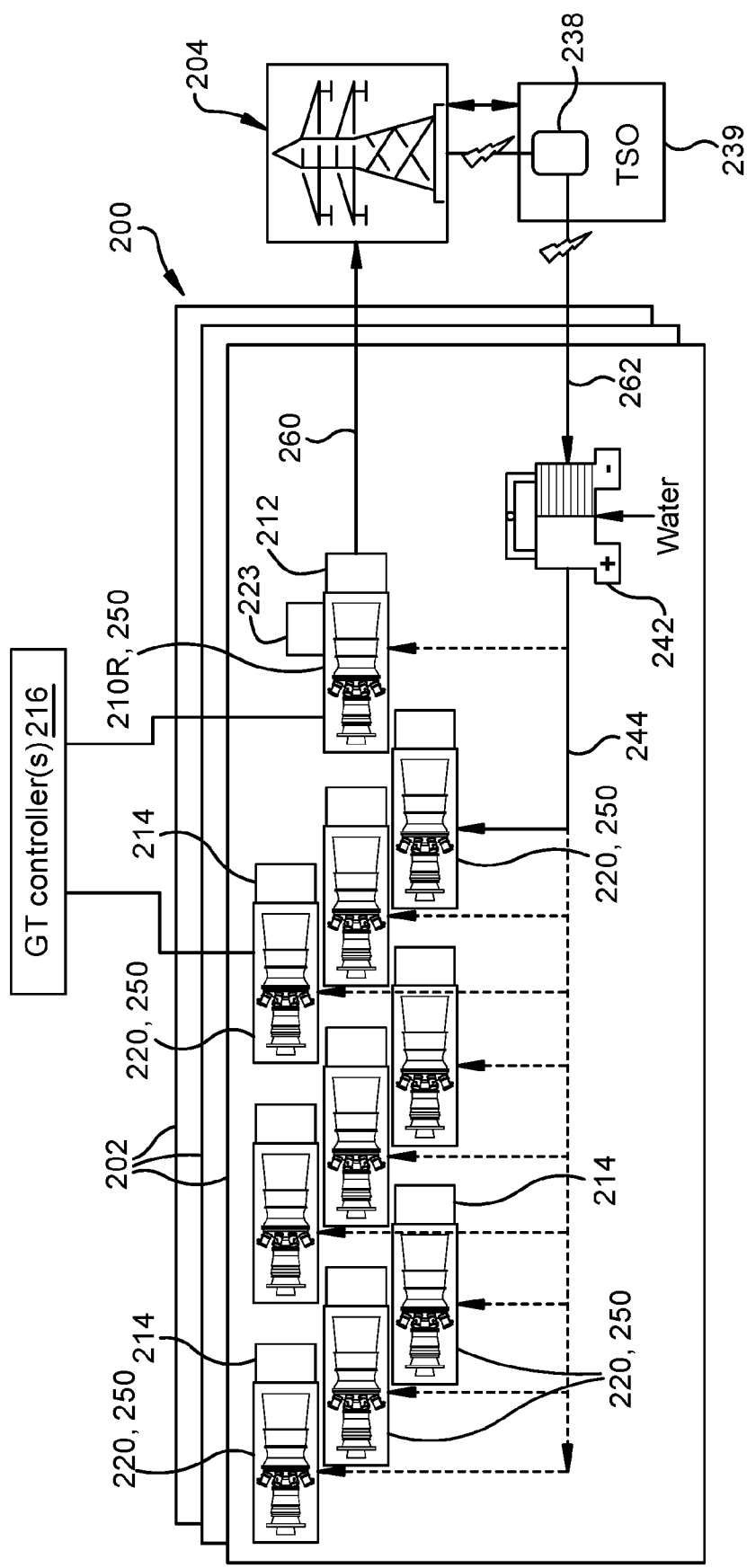
FIG. 7 shows a schematic view of a system, according to other embodiments of the disclosure.

GT systems 210R, 220 may each include a GT controller 216, or they may share a GT controller 216 (only shown in FIGS. 2 and 7 for clarity). GT controller(s) 216 may be part of an overall power plant control system (not shown).

Figure 3:
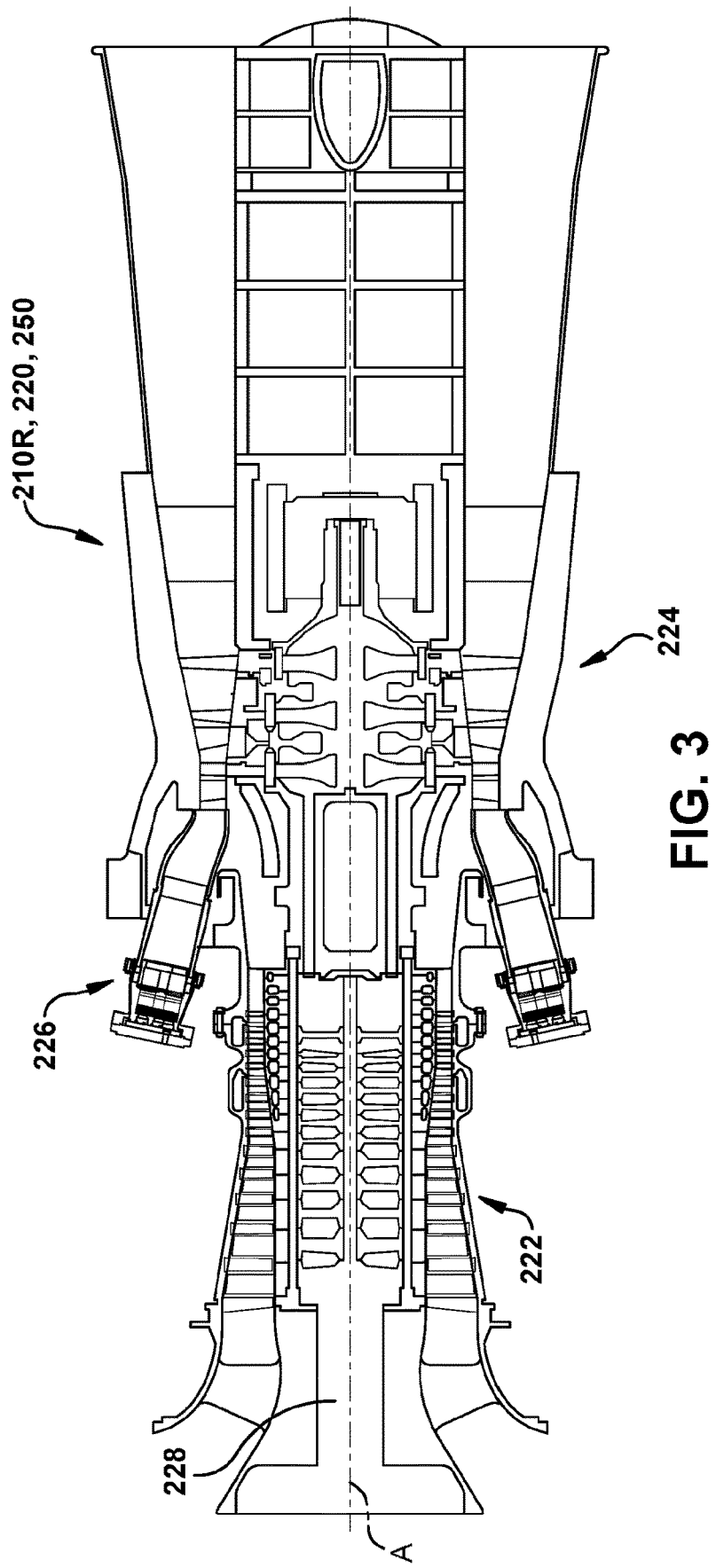
FIG. 3 shows a schematic view of an illustrative gas turbine (GT) system, according to embodiments of the disclosure.

Referring to FIG. 3, a cross-sectional view of an illustrative GT system 210R, 220, 250 in accordance with embodiments of the disclosure is shown. In general, GT systems 210R, 220, 250 operate by extracting energy from a pressurized flow of hot gas produced by the combustion of fuel(s) in a stream of compressed air. GT system 210R, 220, 250 may be configured with an axial compressor 222 that is mechanically coupled by a common shaft or rotor to a downstream turbine section or turbine 224, and one or more combustors 226 positioned between compressor 222 and turbine 224. GT system 210R, 220, 250 may be formed about a common shaft 228 having a central axis A.

Figure 4:
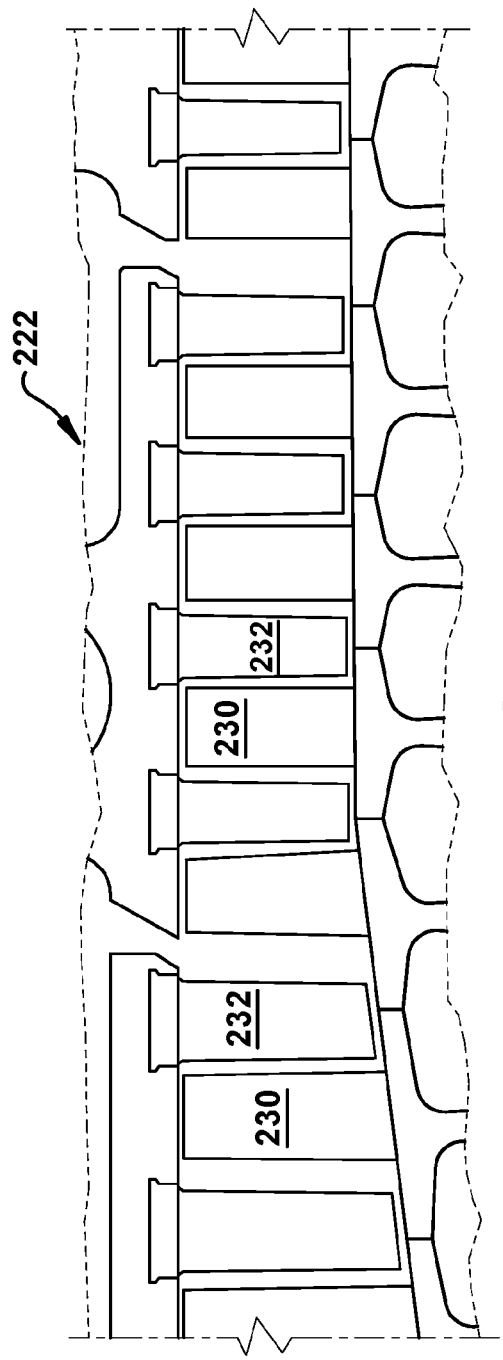
FIG. 4 shows a cross-sectional view of a compressor section of the GT system of FIG. 3.

FIG. 4 shows a cross-sectional view of an illustrative portion of a multi-staged axial compressor 222 that may be used in GT systems 210R, 220, 250 of FIG. 2. Compressor 222 may have a plurality of stages, each of which includes a row of compressor rotor blades 230 and a row of compressor stator blades 232. Thus, a first stage may include a row of compressor rotor blades 230, which rotate about a central shaft, followed by a row of compressor stator blades 232, which remain stationary during operation.

Figure 5:
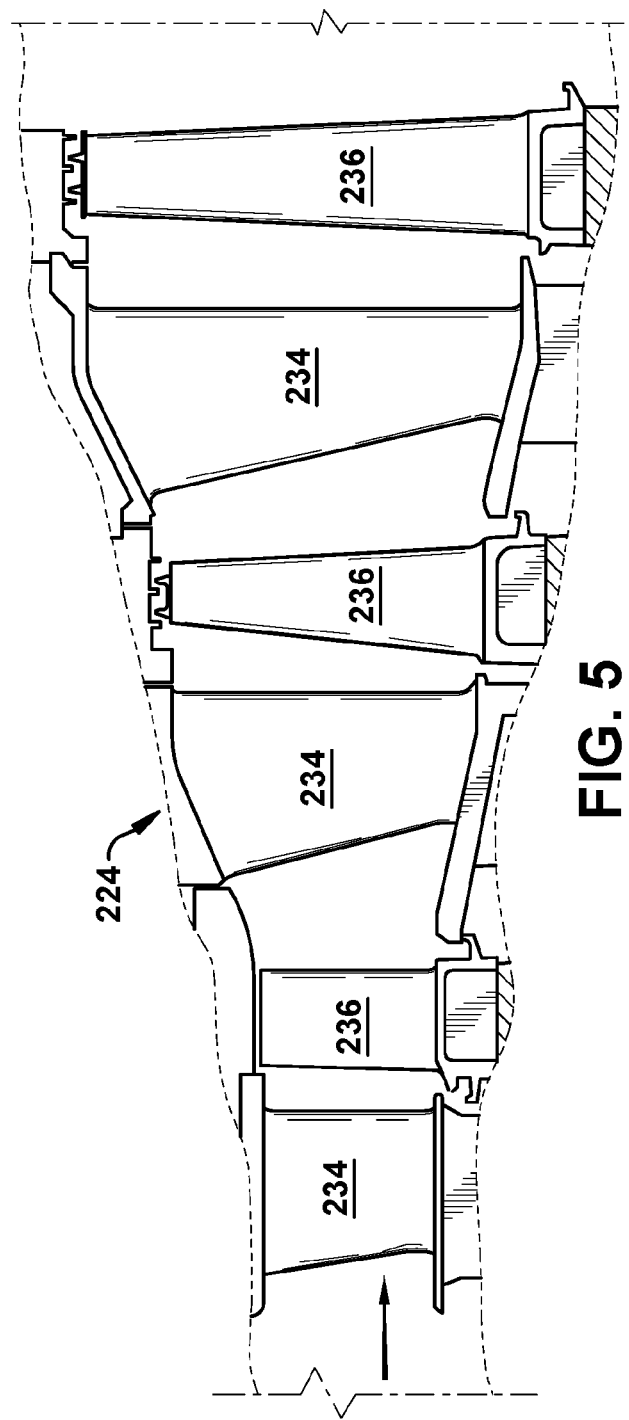
FIG. 5 shows a cross-sectional view of a turbine section of the GT system of FIG. 3.

FIG. 5 shows a partial cross-sectional view of an illustrative turbine section or turbine 224 that may be used in GT systems 210R, 220, 250 of FIG. 2. Turbine 224 also may include a plurality of stages. Three illustrative stages are shown, but more or fewer stages may be present. Each stage may include a plurality of turbine nozzles or stator blades 234, which remain stationary during operation, followed by a plurality of turbine rotor blades 236, which rotate about the shaft during operation. Turbine stator blades 234 generally are circumferentially spaced one from the other and fixed about the axis of rotation to an outer casing. Turbine rotor blades 236 may be mounted on a turbine wheel or rotor disc (not shown) for rotation about a central axis A (FIG. 3). It will be appreciated that turbine stator blades 234 and turbine rotor blades 236 lie in the hot gas path or working fluid flowpath through turbine 224. The direction of flow of the combustion gases or working fluid within the working fluid flowpath is from left to right (based on the orientation of FIG. 5), as indicated by the arrow.

Referring to FIGS. 3-5, in one example of operation for gas turbine 210R, 220, 250, the rotation of compressor rotor blades 230 within axial compressor 222 may compress a flow of air. In combustor(s) 226, energy may be released when the compressed air is mixed with one or more fuels and ignited. The resulting flow of hot gases or working fluid from combustor(s) 226 is then directed over turbine stator blades 234, which induces the rotation of turbine rotor blades 236 about shaft 228. In this way, the energy of the flow of working fluid is transformed into the mechanical energy of the rotating blades and, given the connection between the rotor blades and the shaft, the rotating shaft. The mechanical energy of shaft 228 may then be used to drive the rotation of compressor rotor blades 230, such that a desired or sufficient supply of compressed air is produced. In addition, mechanical energy of shaft 228 may then be used to drive the rotation of one or more generators 212, 214 (FIG. 2) coupled to one or more GT systems 210R, 220 (FIG. 2) to produce electricity.

The fuel(s) used in combustor(s) 226 of GT systems 210R, 220, 250 may be any now known or later developed fuel such as, but not limited to, natural gas, syngas, and/or oil. Generally, where available, hydrogen may be added as a fuel or fuel additive for combustion in combustor(s) 226. Use of hydrogen, among other advantages, increases the combustive energy derived from the burning of the non-hydrogen fuels and reduces emissions such as carbon dioxide. However, externally supplying hydrogen for use in this manner can be expensive due to transportation and/or safe storage requirements.

Returning to FIG. 2, system 200 also includes a controller 238 that controls transmission of the baseload power from reserve GT system 210R. Controller 238 may include any now known or later developed electromechanical control system capable of directing transmission of electricity to different loads. Controller 238 may be part of an overall power plant control system (e.g., controller 216) or may be a separate system. In FIG. 2, controller 238 is shown as located within power plant 202. In one embodiment, controller 238 is controlled by power plant 202, without additional interaction with a TSO 239 than would normally be performed as part of overall operations of power plant 202. In certain other embodiments, controller 238 may be controlled by TSO 239. In one case, controller 238 is located at power plant 202, but controlled by TSO 239. In alternative embodiments, controller 238 may be located elsewhere such as at a TSO 239. As shown in FIG. 2, controller 238 may direct a first portion 237 of the baseload power generated by reserve GT system 210R to grid 204 controlled by TSO 239.

System 200 also includes a hydrogen-producing electrolyzer 242 configured to be selectively powered by reserve GT system 210R. Hydrogen-producing electrolyzer 242 (hereafter "electrolyzer 242") may include any now known or later developed free-standing water electrolysis system. Electrolysis of water is a process that uses electricity to decompose water into oxygen and hydrogen gas. The hydrogen gas released in this process is used as hydrogen fuel 244, according to embodiments of the disclosure. While one electrolyzer 242 is illustrated, any number of free-standing electrolyzers may be provided. Electrolyzer 242 can have any now known or later developed structure capable of carrying out electrolysis of water. In any event, electrolyzer (s) 242 generate a flow of hydrogen fuel 244.

1. In system 200, controller 238 may direct a second portion 246 of the baseload power generated by reserve GT system 210R to power electrolyzer 242. In system 200, electrolyzer 242 is operatively coupled to deliver hydrogen fuel 244 to a (second) GT system 250. For purposes of description, GT system 250 may be referenced herein as a "supplemented GT system 250)" because it receives supplemental fuel in the form of hydrogen from electrolyzer 242. Supplemented GT system 250 may include reserve GT system 210R and/or any primary GT system(s) 220 within system 200. Supplemented GT system 250 may be co-located with primary GT systems 220 and/or reserve GT system 210R. In any event, supplemented GT system 250 may be operatively coupled to a generator 212, 214 to generate power. In the FIG. 2 example, supplemented GT system 250 may be one or more of primary GT systems 220 and/or reserve GT system 210R. In alternative embodiments, described herein (see FIG. 9), electrolyzer 242 and supplemented GT system 250) may be located at a different geographical location from primary GT system(s) 220) and/or reserve GT system 210R. e.g., at a different, remote power plant 202. A plurality of other (third) primary GT systems 220 may co-located with reserve GT system 210R that are not supplemented GT system(s) 250. Each non-supplemented GT system may operatively coupled to a respective or shared (third) generator 214 to generate a baseload power for transmission to wide-area electric grid 104.

Figure 6:
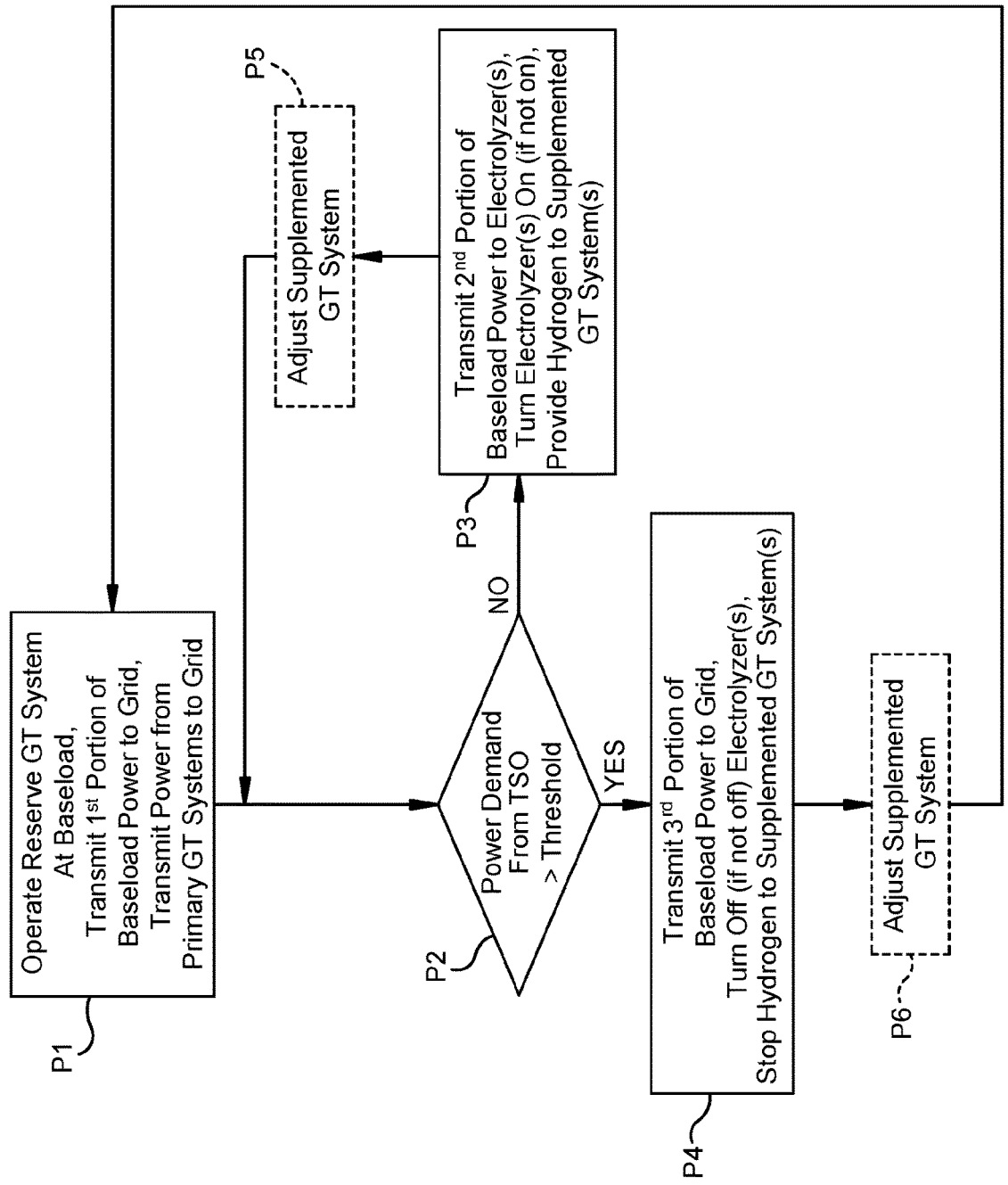
FIG. 6 shows a flow diagram of an operational methodology of a system, according to embodiments of the disclosure.

FIG. 6 shows a flow diagram of an operational methodology of system 200 and, more particularly, controller 238, according to embodiments of the disclosure. With reference to FIGS. 2 and 6, in process step P1, reserve GT system 210R operates at baseload. In accordance with embodiments of the disclosure, reserve GT system 210R always operates at baseload, thus eliminating any inefficiencies caused by providing spinning reserve therewith. In process step P1, a first portion 237 of the baseload power generated by reserve GT system 210R coupled to generator 212 is transmitted to grid 204. First portion 237 may be any portion of the capacity of reserve GT system 210R. e.g., 50%. Also, at process step P1, a baseload power generated by a plurality of primary GT systems 220 and operatively coupled to generator(s) 214 is transmitted to grid 204. As shown in FIG. 2, primary GT systems 220 may be co-located with reserve GT system 210R, although this is not necessary in all cases.

In process step P2, controller 238 determines whether power demand (requested) by TSO 239 for grid 204 exceeds a threshold, i.e., whether the power demand is greater than the threshold. The threshold can be any now known or later developed value indicating that a power demand from TSO 239 for grid 204 requires additional power be generated by power plant 202. The threshold may be created as part of, for example, any now known or later developed AGC algorithm that would normally trigger a call for use of secondary spinning reserve. As such algorithms are well-known, no further description is warranted. Alternatively, the threshold may be manually identified, and controller 238 activated by power plant 202 without knowledge of TSO 239, or it may be manually identified by TSO 239 and controller 238 activated by TSO 239.

A negative response (i.e., 'NO') at process step P2 indicates demand for power from TSO 239 for grid 204 does not exceed the threshold, i.e., there is no need to supply reserve power. In this case, at process step P3, controller 238 instructs a second portion 246 of baseload power generated by reserve GT system 210R to be transmitted to electrolyzer(s) 242 to generate hydrogen fuel 244 for one or both of reserve GT system(s) 210R and supplemented GT system(s) 250. Electrolyzer(s) 242 is turned on, if not already on. As noted, electrolyzer 242 is operatively coupled to deliver hydrogen fuel 244 to reserve GT system(s) 210R and/or supplemented GT system(s) 250, i.e., combustor(s) 226 thereof, which is/are operatively coupled to a generator 212, 214 to generate power. The power from supplemented GT system(s) 250) may be used for grid 204 or for any other purpose.

Hydrogen fuel 244 may be directed to any one or more supplemented GT systems 250 in a known fashion. As recognized, use of hydrogen fuel 244 with GT system(s) may improve emissions of supplemented GT system(s) beyond that possible with conventional hydrocarbon-containing fuel(s). In this manner, second portion 246 of the baseload power of reserve GT system 210R, which would normally be unused spinning reserve, is employed to reduce emissions of one or more supplemented GT systems 250, and thus that of power plant(s) 202. In FIG. 2, as shown by a solid lined arrow, supplemented GT system 250 may be at least one of the plurality of primary GT systems 220. In other embodiments, shown by solid and dashed lined arrows, supplemented GT system 250 may optionally be any number of primary GT system(s) 220 and/or reserve GT system 210R.

Continuing with the flow diagram of FIG. 6, a positive response (i.e., 'YES') at process step P2 indicates the demand for power from TSO 239 for grid 204 exceeds the threshold, which means that power plant 202 and reserve GT system 210R, in particular, needs to provide more power to TSO 239 for grid 204 to maintain stability and to meet demand. Here, in process step P4, controller 238 instructs that a third portion 240 of the baseload power generated by reserve GT system 210R and generator 212 is transmitted to grid 204. In addition, electrolyzer(s) 242 may be turned off, if not already off. In at least one embodiment, third portion 240 of the baseload power of reserve GT system 210R used to power grid 204 is equivalent to second portion 246 of the baseload power of reserve GT system 210R used to power electrolyzer(s) 242, but this is not necessary in all cases. In this manner, an increase in power demand that is sufficient to require additional power from power plant 202 is met by reserve GT system 210R.

In optional process steps P5 and P6 following process steps P3 and P4, respectively, overall GT controller(s) 216 and/or controller 238 may adjust at least a non-hydrogen fuel flow rate of supplemented GT system 250 to maintain an output of supplemented GT system 250 in response the preceding process steps. For example, with regard to process step P5, supplemented GT system 250 may be adjusted in response to transmitting second portion 246 of the baseload power generated by reserve GT system 210R to electrolyzer(s) 242. Here, when flow of hydrogen fuel 244 to supplemented GT system(s) 250 starts (P3), the output of supplemented GT system(s) 250 may increase and/or the volume of non-hydrogen fuel used may decrease.

Alternatively, with regard to process step P6, supplemented GT system 250 may be adjusted in response to transmitting third portion 240 of the baseload power generated by reserve GT system 210R to grid 204. Here, when flow of hydrogen fuel 244 to supplemented GT system(s) 250 stops (P4), the output of supplemented GT system(s) 250 may decrease. In order to maintain the output, at least a non-hydrogen fuel flow rate of supplemented GT system(s) 250 may be adjusted. In some cases, the non-hydrogen fuel flow rate may be increased to increase the output to compensate for any loss of output due to the cessation of the flow of hydrogen fuel 244. In other cases, the non-hydrogen fuel flow rate may be decreased to decrease the output to compensate for any additional output due to the addition of hydrogen fuel 244. Other operational parameters of supplemented GT system(s) 250 may also be adjusted to maintain the output, e.g., inlet vane location, fuel type, fuel composition, staged fuel injection operation, among others.

In certain embodiments, the flow diagram of FIG. 6 can be controlled by power plant 202 with no intervention from, or knowledge by, TSO 239. Alternatively, it can be controlled by TSO 239.

With further regard to generators 212, 214, while each GT system 210R, 220 is shown as including its own generator, it will be recognized that GT systems 210R, 220 may share generators. Hence, at least one of generators 212, 214 used for reserve GT system 210R, primary GT system(s) 220, and supplemented GT system(s) 250 may be the same generator. In the FIG. 2 embodiment, second portion 246 of the baseload power generated by reserve GT system 210R is transmitted directly to electrolyzer(s) 242 to generate flow of hydrogen fuel 244 for the supplemented GT system(s) 250 without passing through grid 204. That is, second portion 246 is maintained within power plant 202. Again, the transmission of second portion 246 may be controlled by power plant 202 or TSO 239.

FIG. 7 shows a schematic view of a system 200, according to other embodiments of the disclosure. Here, reserve GT system 210R is operatively coupled to generator 212 to generate the baseload power, and all of the baseload power is transmitted to grid 204. That is, rather than portioning the baseload power (as in FIG. 2 with first portion 237, second portion 246, and third portion 240), all of the baseload power 260 generated by reserve GT system 210R and generator 212 is transmitted to grid 204. In this embodiment, electrolyzer(s) 242 is configured to be selectively powered by power 262 received from grid 204. Electrolyzer(s) 242 is operatively coupled to deliver hydrogen fuel 244 to supplemented GT system(s) 250, and supplemented GT system(s) 250 are operatively coupled to generator(s) 214 to generate power, e.g., for grid 204 or another load. To power electrolyzer(s) 242 when necessary, power 262 from grid 204 is transmitted/returned to electrolyzer(s) 242 to generate flow of hydrogen fuel 244 for supplemented GT system(s) 250. In this example, controller 238 may be located at TSO 239 of grid 204. For instance, controller 238 may be part of any now known or later developed AGC system or may be a separate system working in coordination with an AGC system or may be manually controlled. In any event, TSO 239 may control use of electrolyzer(s) 242 without interaction with other control systems (e.g., controller 216) of power plant 202.

Figure 8:
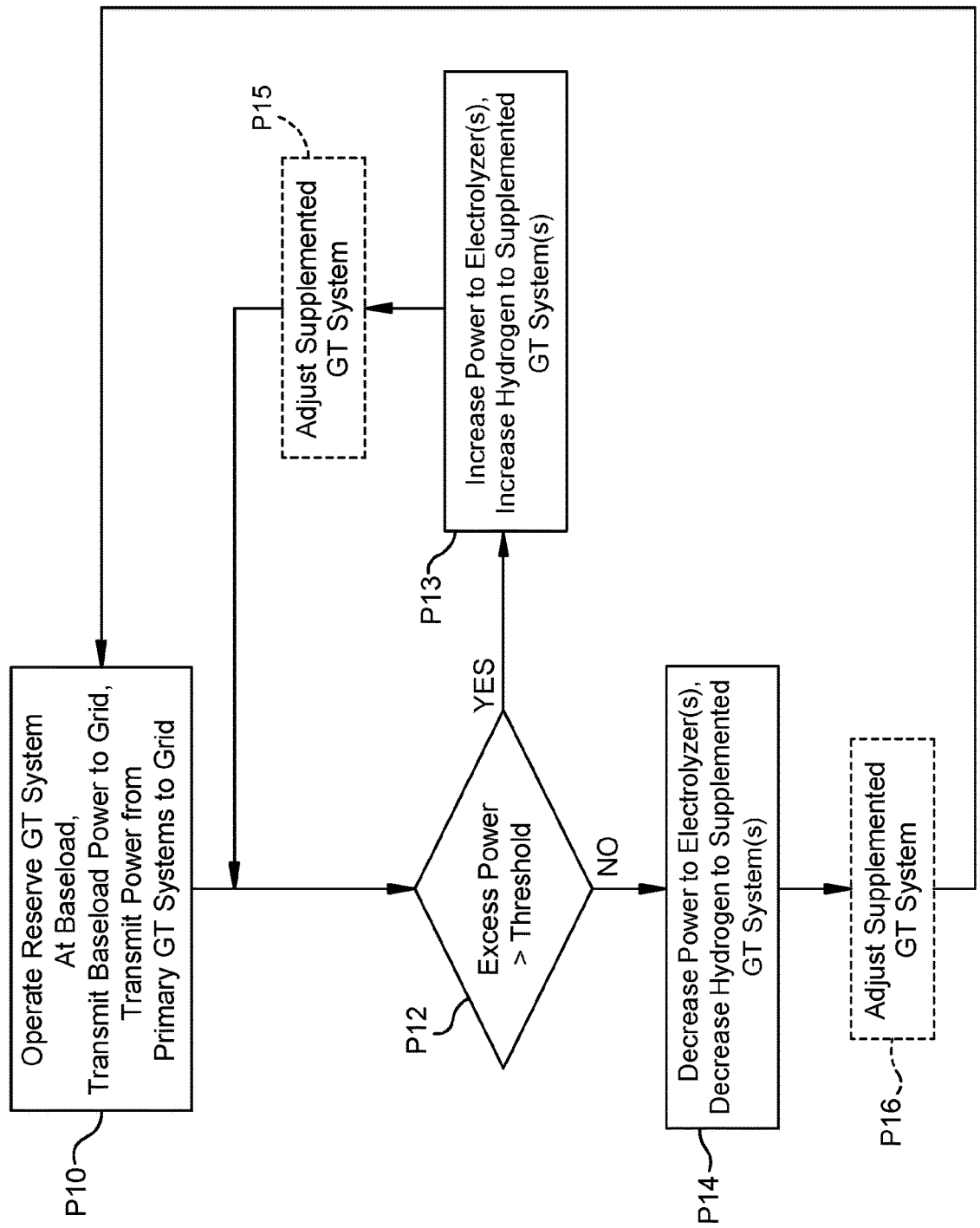
FIG. 8 shows a flow diagram of an operational methodology of a system, according to other embodiments of the disclosure.

FIG. 8 shows a flow diagram of an operational methodology of system 200 and, more particularly, controller 238, according to other embodiments of the disclosure. With reference to FIGS. 7 and 8, in process step P10, reserve GT system 210R is operated at baseload. In accordance with embodiments of the disclosure, reserve GT system 210R is always operated at baseload, thus eliminating any inefficiencies caused by providing spinning reserve therewith. In process step P10, the baseload power 260 generated by reserve GT system 210R coupled to generator 212 is transmitted to grid 204. Also, at process step P10, a baseload power (arrows omitted for clarity) generated by a plurality of primary GT systems 220 and operatively coupled to generator(s) 214 is transmitted to grid 204. As shown in FIG. 2, primary GT systems 220 may be co-located with reserve GT system 210R, although this is not necessary in all cases.

In process step P12, controller 238 determines whether excess power from grid 204 exceeds a threshold, i.e., whether overall power generation of power plants(s) 202 exceeds demand from grid 204 and is greater than the threshold. The threshold can be any now known or later developed value indicating excess power from grid 204 is available. The threshold may be created as part of, for example, any now known or later developed AGC algorithm for indicating that excess power is available, e.g., triggering a call for less power to be generated at power plant(s) 202. As such algorithms are well known, no further description is warranted.

Alternatively, the threshold may be manually identified, and controller 238 activated by TSO 239. A positive response (i.e., 'YES') at process step P12 indicates sufficient excess power from grid 204 for electrolyzer(s) 242 is available. In this case, at process step P13, controller 238 (instructs) increases power 262 to electrolyzer(s) 242 from grid 204 to increase hydrogen fuel generated for supplemented GT system(s) 250. Here, any electrolyzer(s) 242 already in operation may increase their output, and/or more electrolyzer(s) 242 may be turned on that were not already on. Where no electrolyzers 242 were in operation, process step P13 starts electrolyzer(s) 242 to initiate supply of hydrogen fuel 244 to supplemented GT system(s) 250. (Power 262 may be considered a return of a portion of baseload power 260 generated by reserve GT system 210R.)

As noted, electrolyzer(s) 242 is operatively coupled to deliver hydrogen fuel 244 to supplemented GT system(s) 250, which is/are operatively coupled to a generator 212, 214 to generate power. The power from supplemented GT system(s) 250 may be used for grid 204 or for any other purpose. Hydrogen fuel 244 may be directed to any one or more supplemented GT systems 250. As noted, use of hydrogen fuel 244 with supplemented GT system(s) 250 may reduce emissions of those GT system(s) beyond that possible with the hydrocarbon-based fuel. In this manner, baseload power 260 of reserve GT system 210R is employed to its fullest extent, and power 262 is used to reduce emissions of one or more supplemented GT systems 250 and thus that of power plant 202. Any additional power generated by power plant 202 with electrolyzer(s) 242 may be used to reduce generation elsewhere, e.g., where it is not generated as efficiently or as cleanly as in power plant 202 with electrolyzer(s) 242.

In FIG. 7, as shown by a solid lined arrow representing hydrogen fuel 244, supplemented GT system 250 may be at least one of the plurality of primary GT systems 220. Alternatively, as noted, in other embodiments, shown by solid and dashed lined arrows, supplemented GT system 250 may optionally be any number of primary GT system(s) 220 and/or reserve GT system 210R.

Continuing with the flow diagram of FIG. 8, a negative response (i.e., "NO") at process step P12 indicates excess power from grid 204 is not greater than the threshold, e.g., overall excess power does not exist or is insufficient for power 262 from grid 204 to power electrolyzer(s) 242. In this case, in process step P14, controller 238 (instructs) decreases power to electrolyzer(s) 242 from grid 204 to decrease hydrogen fuel 244 generated for supplemented GT system(s) 250. Here, any electrolyzer(s) 242 already in operation may decrease their output, and/or at least some electrolyzers 242 may be turned off. Where insufficient excess power is available, as may be identified by excess power not exceeding the threshold, process step P14 may turn off all electrolyzers 242, thus stopping the supply of hydrogen fuel 244 to supplemented GT system(s) 250.

In optional process steps P15 and P16 following process steps P13 and P14, respectively, overall GT controller(s) 216 and/or controller 238 may adjust at least a non-hydrogen fuel flow rate of supplemented GT system 250 to maintain an output of supplemented GT system 250 in response to the preceding processes. For example, with regard to process step P15, supplemented GT system 250 may be adjusted in response to power 262 being transmitted from grid 204 to electrolyzer(s) 242. Here, when flow of hydrogen fuel 244 to supplemented GT system(s) 250 starts (P13), the output of supplemented GT system(s) 250 may increase.

Alternatively, with regard to process step P16, supplemented GT system 250 may be adjusted in response to a decrease or cessation of power 262 from grid 204 to electrolyzer(s) 242. Here, when flow of hydrogen fuel 244 to supplemented GT system(s) 250 stops (P14), the output of supplemented GT system(s) 250 may decrease. In order to maintain the output, at least a non-hydrogen fuel flow rate of supplemented GT system(s) 250 may be adjusted, i.e., increased to increase the output to compensate for any loss of output due to the cessation of the flow of hydrogen fuel 244, or decreased to decrease the output to compensate for any additional output due to the addition of the flow of hydrogen fuel 244. Other operational parameters of supplemented GT system(s) 250 may also be adjusted to maintain the output, e.g., inlet vane location, fuel type, fuel composition, staged fuel injection operation, among others.

The flow diagram of FIG. 8 can be controlled by TSO 239 with no intervention from power plant 202. Alternatively, it can be controlled by power plant 202.

Figure 9:
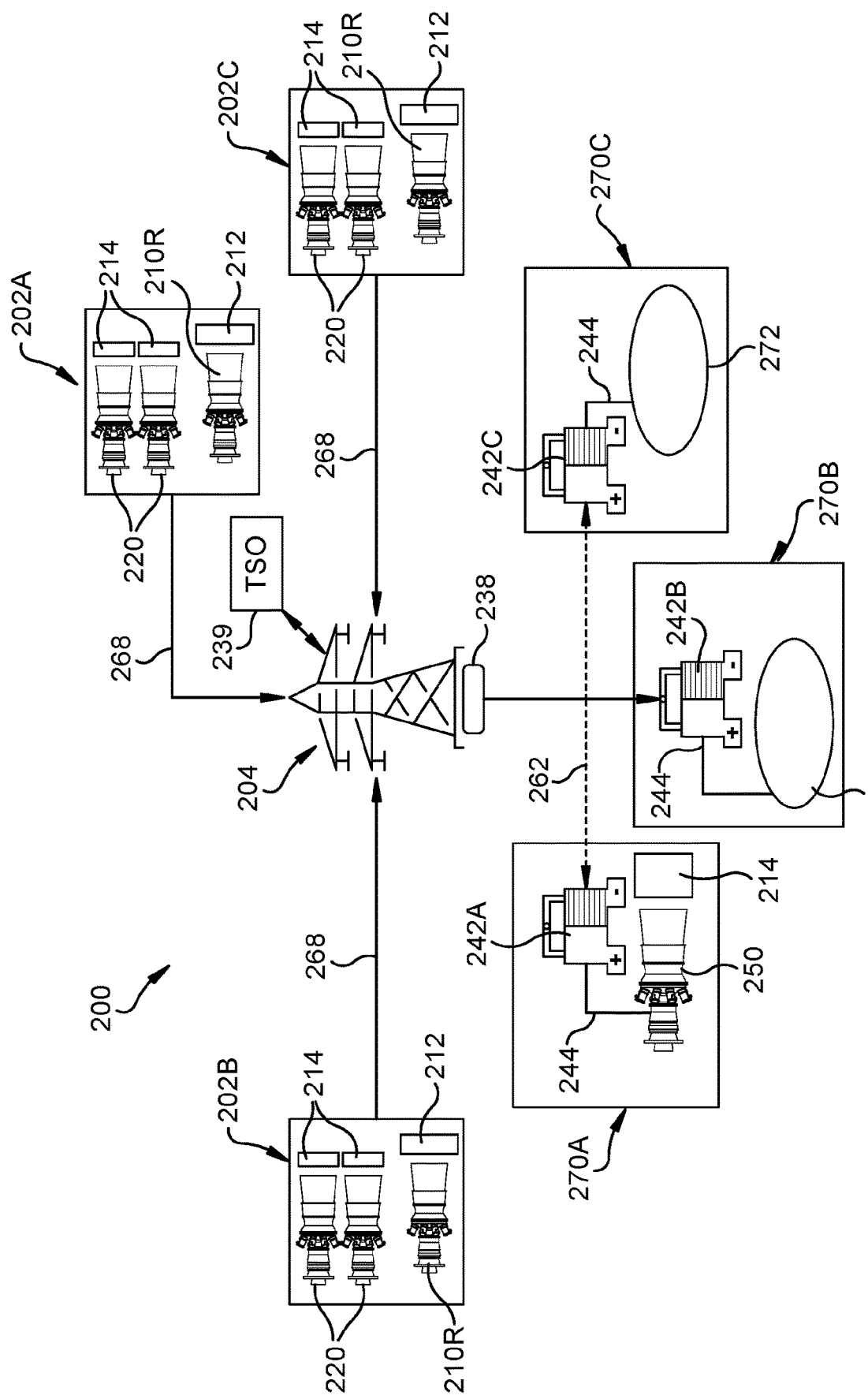
FIG. 9 shows a schematic view of a system, according to additional embodiments of the disclosure.

FIG. 9 shows a schematic view of a system 200, according to additional embodiments of the disclosure. System 200 in FIG. 9 may follow the operational methodology of FIG. 8. Here, any number of power plants 202A-C may be running all GT systems 210R, 220 at baseload.

That is, reserve GT system(s) 210R may be operatively coupled to generator(s) 212 to generate a baseload power that is transmitted to grid 204. Also, a plurality of primary GT systems 220 may be co-located with a respective reserve GT system 210R, operatively coupled to generator(s) 214 to generate a baseload power for transmission to grid 204. Hence, collective baseload power 268 of all the GT systems is transmitted to grid 204.

In these embodiments, electrolyzer(s) 242A-C are not necessarily located with power plants 202A-C, but can be located anywhere hydrogen is needed as a fuel or otherwise, i.e., at sites 270A-C, respectively. In the non-limiting example shown, one hydrogen-producing electrolyzer 242A may supply a supplemented GT system 250 with hydrogen fuel 244 at site 270A. Site 270A is different from power plants 202A-C, and, hence, electrolyzer 242 and supplemented GT system 250 are located at a different geographical location from reserve GT system(s) 210R. Here, electrolyzer 242A may be configured to be selectively powered by power 262 from grid 204. Electrolyzer 242A is operatively coupled to deliver hydrogen fuel 244 to supplemented GT system 250, which is operatively coupled to generator(s) 214 to generate power. Supplemented GT system 250 may be, for example, a GT system that requires lower emissions. Supplemented GT system 250 can be located at any geographical location(s) 270A different from power plant(s) 202A-C.

Other electrolyzers 242B-C at other sites 270B-C may supply hydrogen fuel 244 to any other variety of industrial applications 272 requiring hydrogen as a fuel or otherwise, such as but not limited to: aerospace, transportation, chemical manufacturing, electronics, food and beverage, general manufacturing, glass manufacturing, hospitals/medical, mining, agriculture, construction, pharmaceuticals, plastics, or wood products. Any number of electrolyzers 242 can be powered by grid 204, e.g., through control by a TSO 239 or another entity. Controller 238 may be configured to instruct transmission of power to electrolyzer(s) 242A-C from grid 204 to generate hydrogen fuel 244 for, for example, supplemented GT system 250 at site 270A. This instruction may occur in response to excess power from grid 204 exceeding a threshold (process step P13 and 'YES' at process step P12 in FIG. 8). Alternatively, controller 238 may instruct cessation of power transmission to electrolyzer(s) 242A-C from grid 204 in response to excess power from grid 204 not exceeding the threshold (process step P14, and 'NO' at process step P12 in FIG. 8). Process step P15 in FIG. 8 may also be implemented with system 200 in FIG. 9.

In FIG. 9, controller 238 may be located at TSO 239 of grid 204. Here again, controller 238 may be part of any now known or later developed AGC system or may be a separate system working in coordination with an AGC system or may be manually controlled. In this example, TSO 239 may control use of electrolyzer(s) 242 without interaction with other control systems of power plants 202A-C.

Embodiments of the disclosure provide a system that runs reserve GT system(s) at baseload at all times and that uses excess baseload power not required by the grid during low power demand to power hydrogen-producing electrolyzer (s). The hydrogen fuel from the hydrogen-producing electrolyzer(s) can be injected to another supplemented GT system(s) to reduce emissions of that GT system(s). When grid power demand increases, the system decreases power to the hydrogen-producing electrolyzer(s) (turns down or turns off) and transmits the power from the reserve GT system to the grid to maintain grid stability, thus providing the advantages of spinning reserve without the disadvantages thereof.

The foregoing drawings show some of the processing associated with several embodiments of this disclosure. In this regard, each drawing or block within a flow diagram of the drawings represents a process step associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged: such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A system (200), comprising:
   a first gas turbine (GT) system (210R) operatively coupled to a first generator (212) to generate a baseload power (260), wherein a first portion (237) of the baseload power (260) generated by the first GT system (210R) is transmitted to a wide-area electric grid (204) controlled by a transmission system operator, (TSO) (239);
   a second GT system (220) operatively coupled to a second generator (214) to generate power (262) for transmission to the wide-area electric grid (204);
   wherein the system (200) further includes:
   a hydrogen-producing electrolyzer (242) operatively coupled to deliver hydrogen fuel (244) to one or both of the first GT system (210R) and the second GT system (220), the hydrogen-producing electrolyzer (242) configured to be selectively powered by either a second portion (246) of the baseload power (260) generated by the first GT system (210R); and
   a controller (238) configured to:
   in response to a demand for power (262) from the TSO (239) not exceeding a threshold, instruct that the second portion (246) of the baseload power (260) generated by the first GT system (210R) be transmitted to the hydrogen-producing electrolyzer (242) to generate hydrogen fuel (244) for one or both of the first GT system (210R) and the second GT system (220); and
   in response to the demand for power (262) from the TSO (239) exceeding the threshold, instruct that a third portion (240) of the baseload power (260) generated by the first GT system (210R) be transmitted to the wide-area electric grid (204), stopping, if not already stopped, supply of hydrogen fuel (244) to at least the second GT system (220), and turning off, if not off, the hydrogen-producing electrolyzer (242).

2. The system (200) of claim 1, further comprising a plurality of third GT systems (220) co-located with the first GT system (210R), each third GT system (250) operatively coupled to a third generator to generate a baseload power (260) for transmission to the wide-area electric grid (204).

3. The system (200) of claim 2, wherein the second GT system (220) is at least one of the plurality of third GT systems (250).

4. The system (200) of claim 3, wherein at least two of the first, second, and third generators (114, 212, 214) are the same generator.

5. The system (200) of claim 2, wherein the hydrogen-producing electrolyzer (242) and the second GT system (220) are located at a different geographical location from the first GT system (210R).

6. The system (200) of claim 1, wherein a fourth portion of the baseload power (260) generated by the first GT system (210R) is maintained as a primary control reserve by a governor (223) of the first GT system (210R).

7. The system (200) of claim 1, wherein the second portion (246) of the baseload power (260) generated by the first GT system (210R) is transmitted directly to the hydrogen-producing electrolyzer (242) to generate hydrogen fuel (244) for the one or both of the first GT system (210R) and the second GT system (220) without passing through the wide-area electric grid (204).

8. The system (200) of claim 1, wherein the controller (238) is located at the TSO (239) of the wide-area electric grid (204).

9. The system (200) of claim 8, wherein the third portion (240) of the baseload power (260) generated by the first GT system (210R) is transmitted to the wide-area electric grid (204), and power (262) from the wide-area electric grid (204) is transmitted to the hydrogen-producing electrolyzer (242) to generate hydrogen fuel (244) for the one or both of the first GT system (210R) and the second GT system (220).

10. The system (200) of claim 1, wherein, in response to the controller (238) instructing that the third portion (240) of the baseload power (260) generated by the first GT system (210R) be transmitted to the wide-area electric grid (204), the controller (238) adjusts at least a non-hydrogen fuel (244) flow rate of the second GT system (220) to maintain an output of the second GT system (220).

11. A system (200), comprising:
a first gas turbine (GT) system (210R) operatively coupled to a first generator (212) to generate a baseload power (260), wherein the baseload power (260) is transmitted to a wide-area electric grid (204) controlled by a transmission system operator, (TSO) (239);
a second GT system (220) operatively coupled to a second generator (214) to generate power (262) for transmission to the wide-area electric grid (204);
wherein the system (200) further includes:
a hydrogen-producing electrolyzer (242) configured to be selectively powered by power (262) from the wide-area electric grid (204), the hydrogen-producing electrolyzer (242) operatively coupled to deliver hydrogen fuel (244) to the second GT system (220); and
a controller (238) configured to:
in response to excess power (262) from the wide-area electric grid (204) exceeding a threshold, increasing power (262) to the hydrogen-producing electrolyzer (242) from the wide-area electric grid (204) to increase hydrogen fuel (244) generated for the second GT system (220); and
in response to the excess power (262) from the wide-area electric grid (204) not exceeding a threshold, decreasing power (262) to the hydrogen-producing electrolyzer (242) from the wide-area electric grid (204) to decrease hydrogen fuel (244) generated for the second GT system (220).

12. The system (200) of claim 11, further comprising a plurality of third GT systems (250) co-located with the first GT system (210R), each third GT system (250) operatively coupled to a third generator (220) to generate a baseload power (260) for transmission to the wide-area electric grid (204).

13. The system (200) of claim 12, wherein the second GT system (220) is at least one of the plurality of third GT systems (250).

14. The system (200) of claim 11, wherein the hydrogen-producing electrolyzer (242) and the second GT system (220) are located at a different geographical location from the first GT system (210R).

15. The system (200) of claim 11, wherein, in response to the controller (238) decreasing power (262) to the hydrogen-producing electrolyzer (242) from the wide-area electric grid (204), the controller (238) adjusts at least a non-hydrogen fuel flow rate of the second GT system (220) to maintain an output of the second GT system (220).

16. The system (200) of claim 11, wherein the controller (238) is located at the TSO (239) of the wide-area electric grid.

17. A method, comprising:
transmitting a first portion of a baseload power (260) generated by a first gas turbine (GT) system (210R) coupled to a first generator (212) to a wide-area electric grid (204) controlled by a transmission system operator, (TSO) (239);
in response to a demand for power from the TSO (239) not exceeding a threshold, transmitting a second portion (246) of the baseload power (260) generated by the first GT system (210R) to a hydrogen-producing electrolyzer (242), the hydrogen-producing electrolyzer (242) operatively coupled to deliver hydrogen fuel (244) to a second GT system (220), the second GT system (220) operatively coupled to a second generator to generate power; and
in response to the demand for power (262) from the TSO (239) exceeding the threshold, transmitting a third portion (240) of the baseload power (260) generated by the first GT system (210R) to the wide-area electric grid (204), stopping, if not already stopped, supply of hydrogen fuel (244) to at least the second GT system (220), and turning off, if not off, the hydrogen-producing electrolyzer (242).

18. The method of claim 17, further comprising transmitting a baseload power (260) generated by a plurality of third GT systems (250) and operatively coupled to a third generator (214) to the wide-area electric grid (204), wherein the plurality of third GT systems (250) are co-located with the first GT system (210R), and wherein the second GT system (220) is at least one of the plurality of third GT systems (250).

19. The method of claim 17, wherein the hydrogen-producing electrolyzer (242) and the second GT system (220) are located at a different geographical location from the first GT system (210R).

20. The method of claim 17, wherein, in response to transmitting the third portion (240) of the baseload power (260) generated by the first GT system (210R) to the wide-area electric grid (204), adjusting at least a non-hydrogen fuel (244) flow rate of the second GT system (220) to maintain an output of the second GT system (220).

* * * * *

UNITED STATES PATENT AND TRADEMARK OFFICE
CERTIFICATE OF CORRECTION

PATENT NO. : 12,249,838 B2
APPLICATION NO. : 18/576665
DATED : March 11, 2025
INVENTOR(S) : Baha Mahmoud Suleiman et al.

Page 1 of 1

It is certified that error appears in the above-identified patent and that said Letters Patent is hereby corrected as shown below:

On the Title Page

Under item (72) Inventors, Lines 1-2, delete "Damman (SA);" and insert -- Dammam (SA); --, therefor.

In Column 1, under item (72) Inventors, Line 2, delete "Damman (SA);" and insert -- Dammam (SA); --, therefor.

In Column 1, under item (72) Inventors, Line 3, delete "Damman (SA);" and insert -- Dammam (SA); --, therefor.

In Column 1, under item (72) Inventors, Lines 4-5, delete "Damman (SA);" and insert -- Dammam (SA); --, therefor.

In the Claims

In Column 16, Claim 1, Line 24, delete "powered by either" and insert -- powered by --, therefor.

In Column 16, Claim 2, Line 46, delete "third GT systems (220)" and insert -- third GT systems (250) --, therefor.

Signed and Sealed this
Sixth Day of May, 2025

Coke Morgan Stewart
*Acting Director of the United States Patent and Trademark Office*